United States Patent
Dickinson

(10) Patent No.: US 7,601,094 B2
(45) Date of Patent: Oct. 13, 2009

(54) METHOD OF CLUTCH PRESSURE REGULATION DURING DOWNSHIFT OF A VEHICLE WITH AUTOMATIC TRANSMISSION

(75) Inventor: Mike Dickinson, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 339 days.

(21) Appl. No.: 11/419,813

(22) Filed: May 23, 2006

(65) Prior Publication Data

US 2007/0072737 A1 Mar. 29, 2007

Related U.S. Application Data

(60) Provisional application No. 60/721,610, filed on Sep. 29, 2005.

(51) Int. Cl.
*B60W 10/06* (2006.01)
(52) U.S. Cl. ......................... 477/78; 477/176
(58) Field of Classification Search ............. 477/78, 477/176
See application file for complete search history.

(56) References Cited

U.S. PATENT DOCUMENTS

| | | | |
|---|---|---|---|
| 5,480,363 A | 1/1996 | Matsubara et al. | |
| 5,733,223 A | 3/1998 | Matsubara et al. | |
| 5,816,979 A * | 10/1998 | Shiiba et al. | 477/176 |
| 6,036,619 A | 3/2000 | Tashiro et al. | |
| 6,074,326 A | 6/2000 | Sakakibara et al. | |
| 6,099,436 A | 8/2000 | Kon et al. | |
| 6,183,391 B1 | 2/2001 | Iijima | |
| 6,702,715 B2 | 3/2004 | Eguchi et al. | |
| 6,719,664 B2 | 4/2004 | Ito et al. | |

* cited by examiner

*Primary Examiner*—Roger L Pang
*Assistant Examiner*—Derek D Knight
(74) *Attorney, Agent, or Firm*—Rankin, Hill & Clark LLP; Mark E. Duell

(57) ABSTRACT

A method for maintaining a fuel cut function in a vehicle wherein, depending on the rate of vehicle deceleration, the pressure upon the lock-up and shift clutches associated with the vehicle's automatic transmission is changed accordingly. This is unlike prior practice, where a fixed pressure was applied to the lock-up and shift clutches at all deceleration rates. In the present invention, if the rate of deceleration is small, the pressure applied to the shift and lock-up clutches is low; there is no increase of the applied pressures. If the rate of deceleration is moderate, the pressure on the lock-up and shift clutches is moderately increased. If the rate of deceleration is high, there is no increase of the applied pressures. Further, if the rate of deceleration is high, the lock-up clutch is completely disengaged.

11 Claims, 5 Drawing Sheets

METHOD OF CLUTCH PRESSURE REGULATION DURING DOWNSHIFT OF A VEHICLE WITH AUTOMATIC TRANSMISSION

This application claims priority to U.S. Provisional Application No. 60/721,610, filed on Sep. 29, 2005, the entirety of which is incorporated herein.

BACKGROUND OF THE INVENTION

Improvement of fuel economy in modern vehicles continues to be an important aspect of engine and transmission design. One known method of improving fuel economy is to implement a fuel cut mode when the vehicle is coasting, with the throttle closed, while traveling at relatively high speeds. The supply of fuel is cut off from the engine and the vehicle allowed to coast until the engine speed drops below a certain threshold or a request to accelerate the vehicle is once again made (the throttle is opened). If the vehicle is decelerating and has an automatic transmission, gear shifting, typically from fifth for fourth gears may occur while the vehicle is in a fuel cut mode.

As shown in FIG. 4, an automatic transmission includes a lock-up clutch 14, associated with a torque converter, between the engine crankshaft and transmission input shaft and a series of shift clutches 12 associated with numbered ($1^{st}$-$5^{th}$) transmission speed trains. The lock-up clutch 14 locks the engine crankshaft to the transmission input shaft as the vehicle speed reaches approximately 72-80 KPH. The transmission proceeds from lower gears (1, 2) to higher gears (4, 5) as the vehicle speed is increased and back down to the lower gears as the vehicle speed decreases. Each time the transmission advances upward or downward from gear to gear, an appropriate shift clutch is disengaged, then re-engaged, allowing a smooth shift.

During a shift from fifth gear to fourth gear, made in combination with application of the vehicle's brakes, overslip of the lock-up and shift clutches occurs and as a result the engine speed drops more than if such overslip did not occur (no brake application). FIG. 1a shows the operating parameters of the vehicle during a shift from fifth to fourth gear with little or no deceleration caused by braking. Note, the fuel cut mode (FC) is able to remain on. FIGS. 1b and 1c illustrate the same operating parameters with moderate or high deceleration (DTV), respectively, caused by braking. As a result of dropping engine speed (NE), the fuel cut mode (FC) cannot be maintained for a desired length of time.

To satisfy Fuel Economy tests designed by the EPA, the fuel cut mode must be maintained during a shift from fifth to fourth gear when the vehicle is decelerating moderately. However, the fuel cut mode does not need to be maintained during high deceleration.

Referring to FIGS. 2a-2c, to remedy the inability to maintain the fuel cut mode, the clutch pressure of the lock-up clutch (LC) is increased by a consistent amount during shifting. The vehicle deceleration rates (DTV) represented in FIGS. 2a-2c corresponds to the deceleration rates of FIGS. 1a-1c, respectively. Additionally, the clutch pressure of the individual shift clutch(es) (e.g. $5^{th}$) is also increased by a consistent amount (typically not equal to the increased amount of the lock-up clutch) during shifting. Such pressure increases prevent significant engine speed drop (NE) and allow the fuel cut mode (FC) to be maintained during moderate deceleration (represented by FIG. 2b) and high deceleration (represented by FIG. 2c) wherein the fuel cut mode could not be maintained in instances of similar deceleration (FIGS. 1b and 1c). This is illustrated by comparing the engine speed line to the FC threshold horizontal line in FIGS. 2a-2c. However, the increase in lock-up clutch and shift clutch pressures detrimentally increases "shift shock", a phenomenon caused by poor timing of sequential clutch disengagement of a shift clutch. Shift shock causes discomfort to the vehicle operator and is undesirable.

What is desired is a method of engine and transmission operation that allows the engine to remain in a fuel cut mode for an extended time, even during a downshift, while minimizing the phenomenon of shift shock. The viability of the method must be demonstrable during Fuel Economy testing designed by the Environmental Protection Agency (EPA), that includes a fifth to fourth downshift step while braking the vehicle.

BRIEF SUMMARY OF THE INVENTION

The method of the present invention utilizes the measured rate of vehicle acceleration or deceleration (hereinafter DTV). Depending on the rate of deceleration, the pressure upon the lock-up and shift clutches is modulated to improve fuel efficiency and user comfort accordingly. In prior practice, these pressures were set particularly high, and at a fixed level, in order to guarantee fuel efficiency, but sacrificing user comfort by causing excessive amounts of shift shock. In the present invention, the clutch pressures are manipulated or controlled in accordance with several vehicle deceleration rates. For example, if the rate of deceleration is low, the pressure applied to the shift and lock-up clutches is low; there is no increase of the applied pressures. If the rate of deceleration is moderate, the pressure on the lock-up and shift clutches is moderately increased. If the rate of deceleration is high, the fuel cut mode need not be maintained to meet EPA tests, thus, the pressure on the shift clutch is low; there is no increase of the applied pressures. Further, if the rate of deceleration is high, the lock-up clutch is completely disengaged.

As a result of selective pressure manipulation based on deceleration, the fuel cut mode is maintained on the vehicle for an increased period of time resulting in improved vehicle fuel economy. In addition, an overly large pressure is not used to maintain the fuel cut mode and additional pressure is not applied in instances of high deceleration rates, and as a result shift shock is minimized resulting in greater driver comfort.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

As used in this description and in the appended claims, the following terms will have the definitions indicated thereafter:

1) "GRATIO slip" means the slippage of a shift clutch associated with a specified gear train in an automatic transmission;

2) "LC slip" means the slippage of the lock-up clutch used in combination with the torque converter on a vehicle with an automatic transmission;

3) "NE" means the rotational speed of the vehicle engine (in rpm);

4) "DTV" means the electronic output of the vehicle computer relating to vehicle deceleration rate;

5) "Fuel Cut Control Function" means operation of a vehicle wherein above a designated engine speed (and vehicle speed; the vehicle's motion solely driving the engine), with the throttle closed, fuel is not supplied to the engine.

Referring to FIGS. 3a-3c and 5, an improved method of shifting the automatic transmission 10 of a vehicle is provided. This improved method maintains vehicle operating conditions that provide superior fuel economy without sacrificing the vehicle driver's comfort. Specifically, the phenomenon known as shift shock is minimized. Accordingly, the present invention, to be described hereafter in greater detail, provides superior fuel economy and driver comfort, especially in situations of down shifting within the higher transmission gears, such as fifth to fourth, and sometimes fourth to third gears.

Figure 1C:
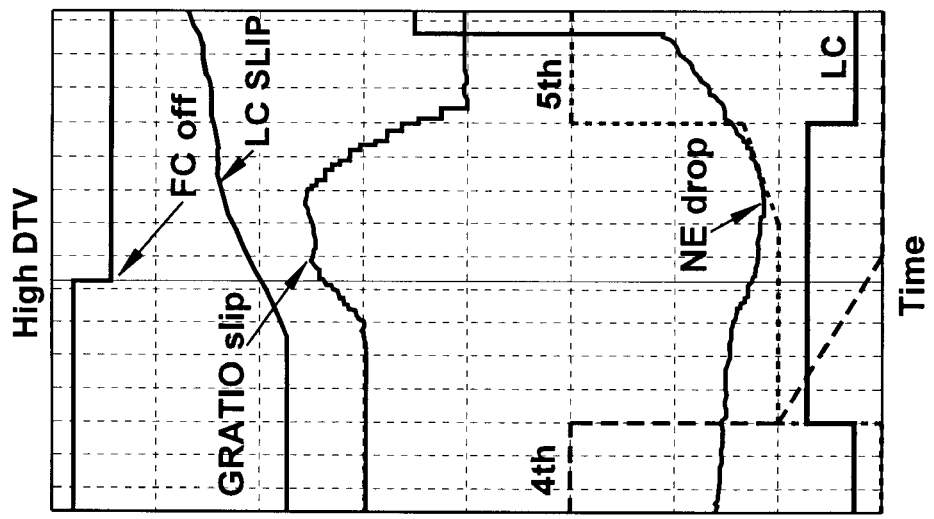
FIG. 1c is a chart showing known performance of a vehicle engine and transmission at a high rate of deceleration.
Figure 1B:
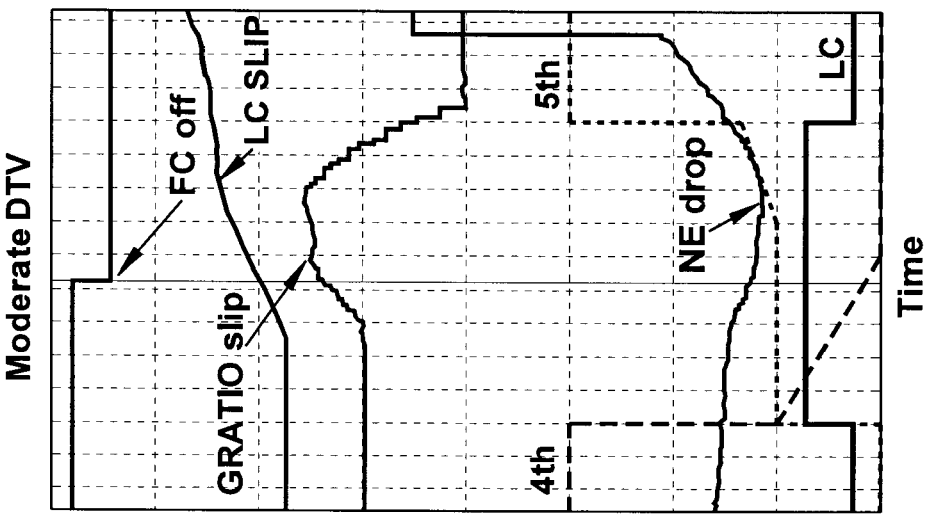
FIG. 1b is a chart showing known performance of a vehicle engine and transmission at a moderate rate of deceleration.
Figure 1A:
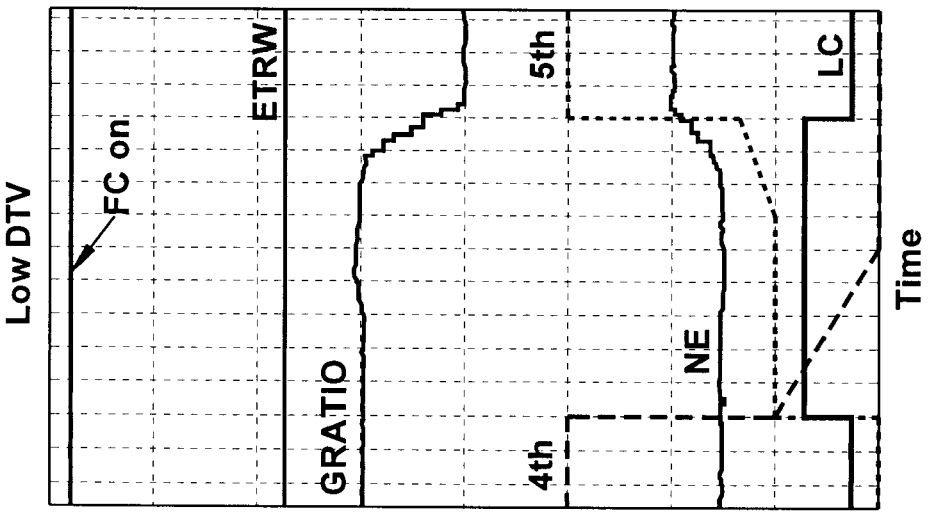
FIG. 1a is a chart showing known performance of a vehicle engine and transmission at a low rate of deceleration.

The performance of a vehicle without using the improvements of the present invention is shown in FIGS. 1a-1c at various deceleration rates (deceleration typically caused by braking). Braking causes a variation of load on the vehicle's shift clutches 12 and lock-up clutch 14. FIG. 1a shows that in instances of no braking or moderate braking, it is possible to maintain the engine speed (NE) high enough to maintain the fuel cut control function without substantially affecting driver comfort (FC On). However, during heavier braking (FIGS. 1b and 1c), the fuel cut control function must be discontinued due to excessive slippage of the shift (GRATIO slip) and lock-up (LC Slip) clutches 12 and 14. Specifically, the clutch slip causes the engine speed (NE) to drop out of a range where the fuel-cut control function can be used.

Figure 2C:
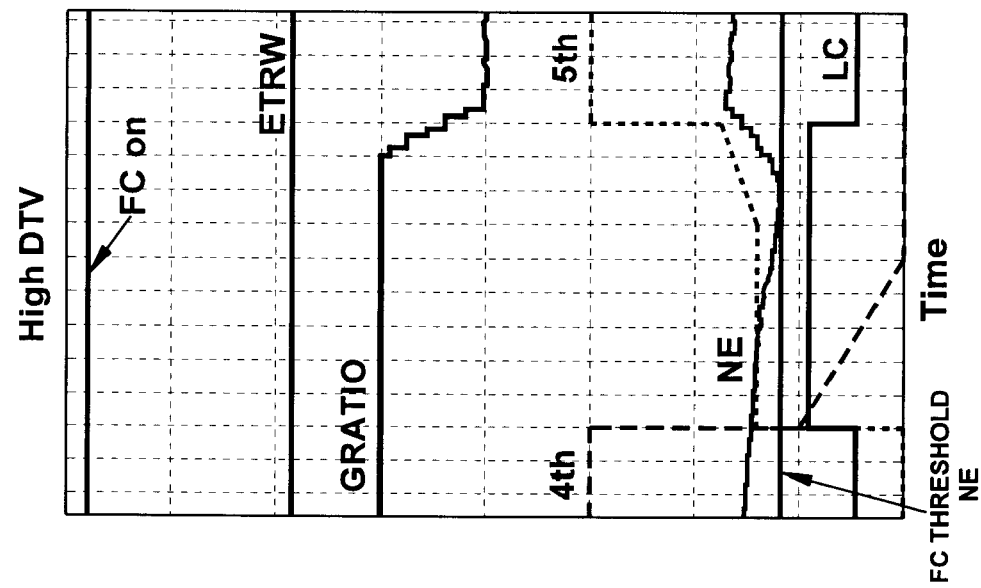
FIG. 2c is a chart showing performance of a vehicle engine and transmission at a high rate of deceleration utilizing increased clutch pressures.
Figure 2B:
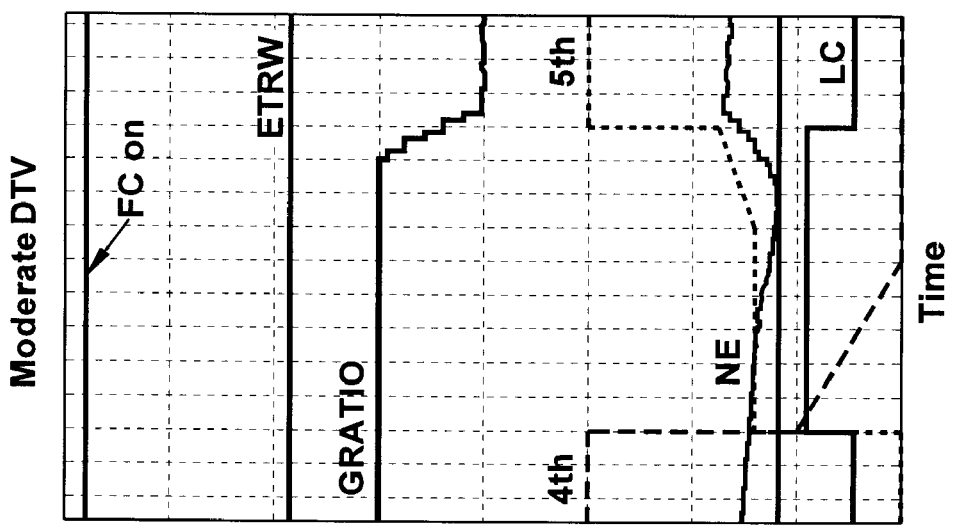
FIG. 2b is a chart showing performance of a vehicle engine and transmission at a moderate rate of deceleration utilizing increased clutch pressures.
Figure 2A:
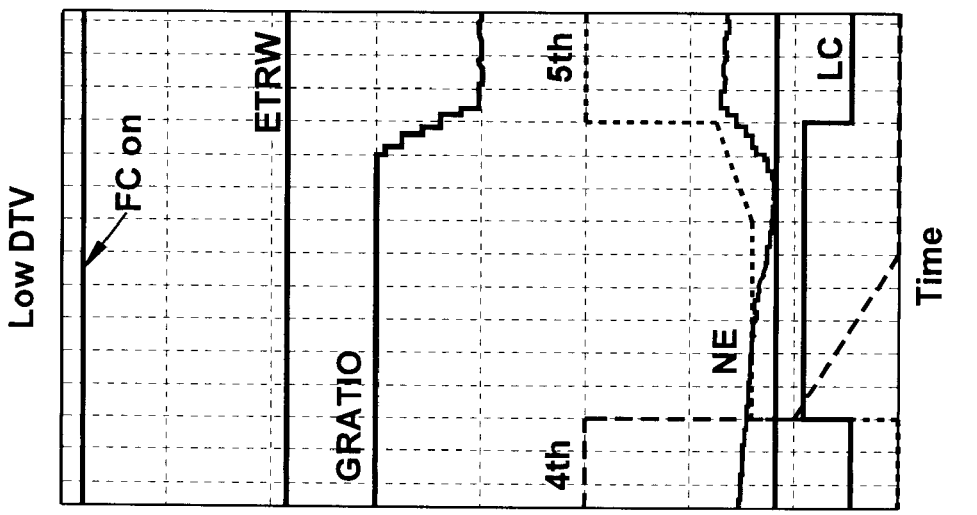
FIG. 2a is a chart showing performance of a vehicle engine and transmission at a low rate of deceleration utilizing increased clutch pressures.

FIGS. 2a-2c, as previously described, illustrates one method of preventing excessive slippage of the lock-up clutch and shift clutches, by increasing the pressure of the lock-up clutch and shift clutches by a consistent amount during shifting under all operating conditions. As previously described, this method provides the unwanted phenomenon of "shift shock" which is especially prevalent at high rates of vehicle deceleration. High rates of deceleration cause greater amounts of GRATIO slip. And if the shift clutch pressure is increasing too rapidly at the point where GRATIO begins to change, there will be harsh shift shock.

Figure 3C:
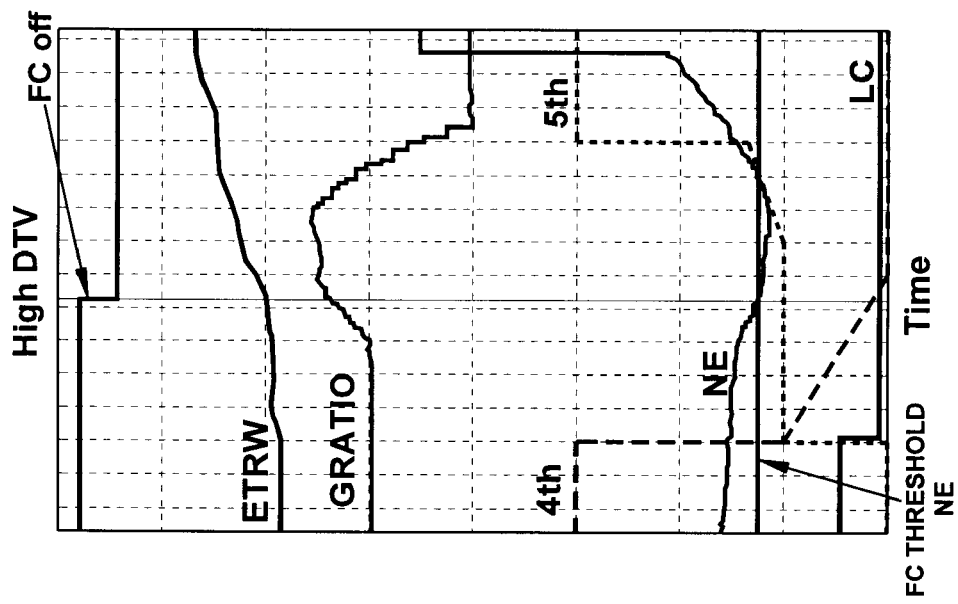
FIG. 3c is a chart showing performance of a vehicle engine and transmission at a high rate of deceleration utilizing the method of the present invention.
Figure 3B:
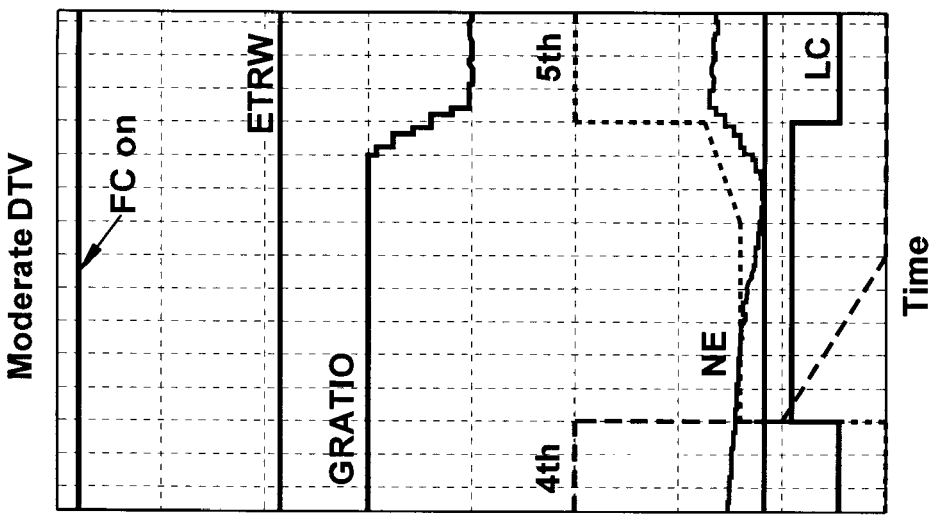
FIG. 3b is a chart showing performance of a vehicle engine and transmission at a moderate rate of deceleration utilizing the method of the present invention.
Figure 3A:
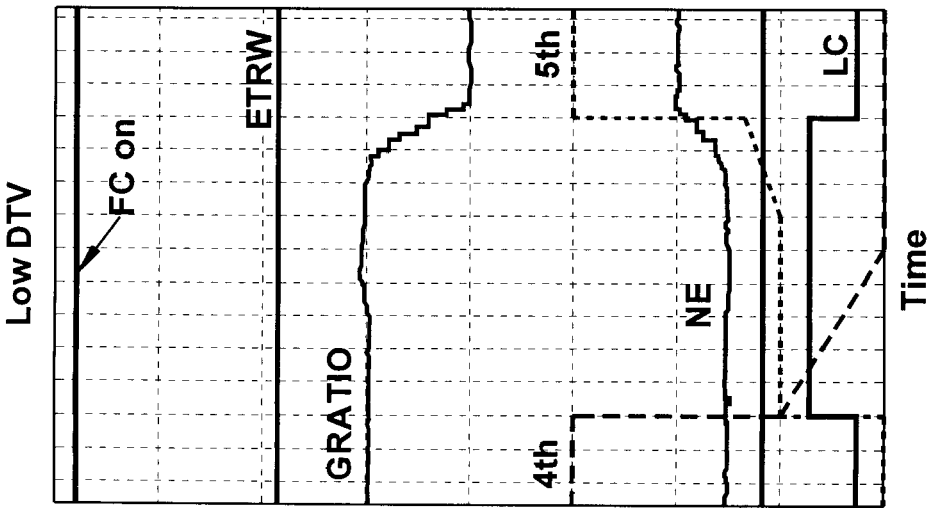
FIG. 3a is a chart showing performance of a vehicle engine and transmission at a low rate of deceleration utilizing the method of the present invention.
Figure 4:
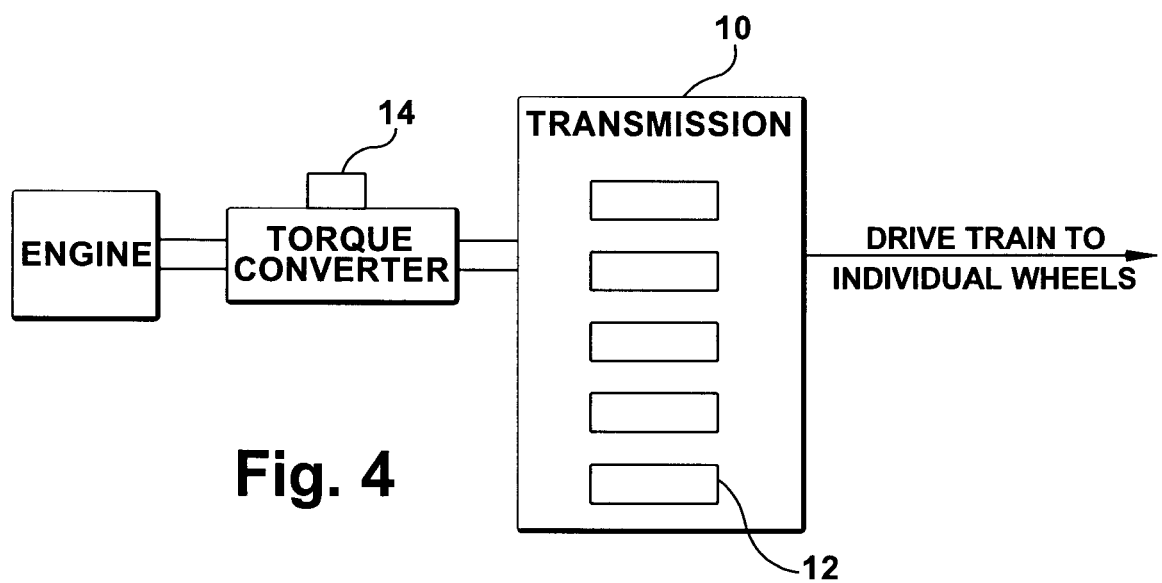
FIG. 4 schematically illustrates a vehicle engine and drivetrain.

FIGS. 3a-3c, illustrate vehicle performance at deceleration rates comparable to FIGS. 1a-1c and 2a-2c, but utilizing the method of the present invention.

Figure 5:
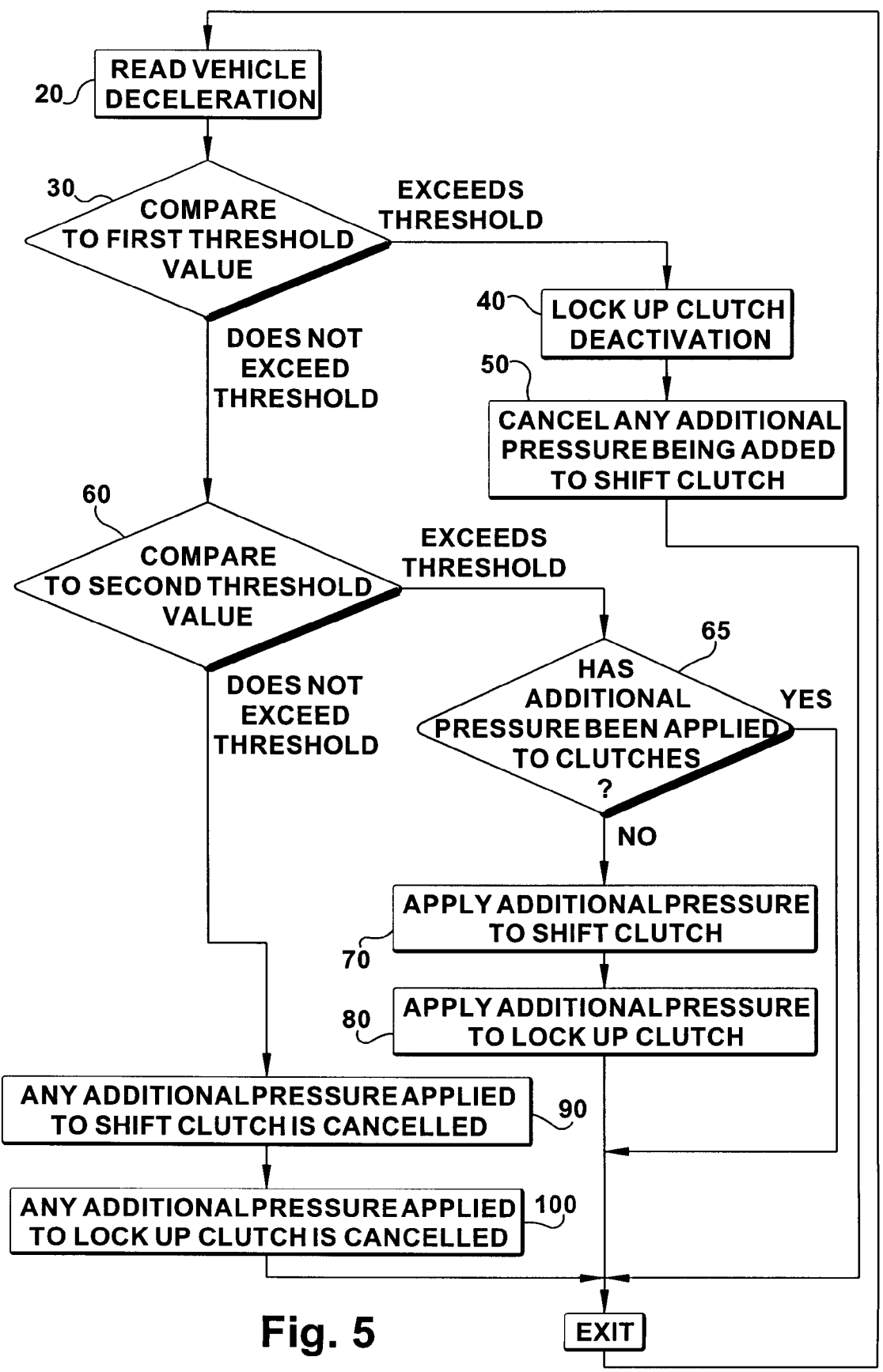
FIG. 5 schematically illustrates a technique of the present invention of adjusting clutch pressures within a vehicle transmission.

Referring to FIG. 5, as well as FIGS. 3a-3c, a schematic representation of the method used to control the pressure applied to the vehicle shift and lock-up clutches 12 and 14 is provided. This improved method uses measurements of vehicle deceleration, typically caused by braking, to determine a required level of pressure to be placed upon the shift and lock-up clutches in order to allow the vehicle to remain operating in the fuel cut control function, thereby increasing fuel efficiency. Accordingly, the present invention provides less shift shock and, thus, greater operator comfort, especially in situations of moderate and heavy vehicle braking.

In step 20 of FIG. 5, readings of vehicle deceleration are made. These readings are made by one or more sensors, as are known in the art, and are provided as an output DTV from the vehicle's computer system. The sensed vehicle deceleration is compared, in step 30, to a first threshold value. The first threshold value represents the boundary between moderate and high vehicle deceleration. The first threshold value of deceleration is preferably about 1.5 meters per second squared. Deceleration may also be referred to as a negative value of acceleration (e.g. −1.5 meters per second squared acceleration).

If the sensed vehicle deceleration exceeds the first threshold value of deceleration (e.g. increases to 2 meters per second squared), an instance illustrated by FIG. 3, a lock-up clutch deactivation step 40 is executed. Instead of locking the output of the engine crankshaft and the transmission input shaft within the vehicle's torque converter, the torque converter relies only upon fluid communication between the engine crankshaft and transmission input shaft. The lock-up clutch pressure illustrated by FIG. 3c approaches zero. Additionally, a step 50 of canceling any amounts of additional pressure added to the shift clutch of the transmission gear train at which the next downshift is to occur is performed.

If the sensed vehicle deceleration does not exceed the first threshold value of vehicle deceleration, comparison to a second, lower, deceleration value is made at step 60. The second threshold value of deceleration is preferably about 0.75 meters per second squared. If the sensed vehicle deceleration exceeds the second threshold value of deceleration, two steps are performed. This instance is illustrated in FIG. 3b. After confirming that additional pressure has not already been added to the shift clutch or lock-up clutch, in step 65, in step 70, a first amount of additional pressure is applied to the shift clutch of the transmission gear train at which the next downshift is to occur ($5^{th}$). In a second step 80, a second amount of additional pressure, which causes a pressure increase, is added to the pressure being applied to the lock-up clutch (LC). If subsequent measurements of deceleration are also less than the first threshold value, but greater than the second threshold value, but first and second amounts of additional pressure have already been applied to the shift and lock-up clutches previously and have not been cancelled, then no additional amounts of additional pressure are applied to either the shift or lock-up clutches. Preferably, measurements of vehicle deceleration are taken every 100 milliseconds using sensors that are well known in the art.

If the sensed vehicle deceleration does not exceed either the first threshold value or second threshold values of deceleration, two steps are performed. This instance is illustrated in FIG. 3a. In a first step 90, any amount of additional pressure applied to the shift clutch of the transmission gear train at which the next downshift is to occur is cancelled. As a result, any shift shock generated by the transmission, upon shifting, is much less noticeable. In a second step 100, any amount of additional pressure applied to the lock-up clutch is cancelled.

The deceleration of the vehicle is sampled periodically and compared to the threshold values after each sampling. Although all clutch pressures have been referred to as actual clutch pressure, an equivalent method has each of the previously described clutch pressures as requests for clutch pressure within a vehicle control system. It is understood that achieving an actual clutch pressure may not be the instantaneous result of implementing a request for such a clutch pressure and that the magnitude of actual clutch pressure may not reach the exact magnitude of the requested clutch pressure.

Although the method of the present invention has been described for use on shift clutch and lock-up clutch pressure management during a shift from fifth to fourth gear, the method may also be used during a shift from fourth to third gear.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method of improving shift quality and fuel economy in a vehicle having an engine and an automatic transmission including a lock-up clutch and one or more shift clutches which are provided with an initial amount of engaging pressure, comprising the steps of:
   implementing a fuel cut control function in operation of the vehicle engine;
   determining deceleration of the vehicle;
   when in a first range of vehicle deceleration, applying a first amount of additional engaging pressure to the lock-up clutch and a second amount of additional engaging pressure to the at least one of the shift clutches if not already applied;
   when in a second range of vehicle deceleration, wherein deceleration is less than in said first range, canceling any of said first amount of additional pressure applied to the lock-up clutch and canceling any of said second amount of additional pressure applied to the shift clutches;
   when in a third range of vehicle deceleration, wherein deceleration is greater than in said first and second ranges, canceling any of said second amount of additional pressure applied to the shift clutches;
   repeating the steps of determining vehicle deceleration, and changing either the shift and/or lock-up clutch pressure(s) based on the determined decelerationas required, and
   at some time during the cycle of determining deceleration and changing clutch pressure(s) as required, causing the vehicle to downshift.

2. The method of improving shift quality of claim 1, wherein during said third range the lock-up clutch is fully disengaged.

3. The method of improving shift quality of claim 1, wherein the downshifting occurs from fifth gear to fourth gear.

4. The method of improving shift quality of claim 1, wherein shifting occurs from fourth gear to third gear.

5. The method of improving shift quality of claim 1, wherein said first amount of additional engaging pressure and said second amount of additional engaging pressure are not equal to one another.

6. The method of improving shift quality of claim 1, wherein deceleration within the first range of deceleration is caused by vehicle braking.

7. The method if improving shift quality of claim 6, wherein deceleration within the third range of vehicle deceleration is caused by vehicle braking.

8. The method of improving shift quality of claim 1, wherein the first range of deceleration is from about 0.75 m/s2 to about 1.5 m/s2.

9. The method of improving shift quality of claim 8, wherein the second range of deceleration is from about 0 m/s2 to about 0.75 m/s2.

10. The method of improving shift quality of claim 9, wherein the third range of deceleration is greater than 1.5 m/s2.

11. A method for controlling operation of an automatic transmission and torque converter so as to increase fuel cut operation of a vehicle engine while reducing shift shock, wherein the vehicle includes a lockup clutch and one or more shift clutches having an initial engaging pressure, comprising the steps of:
   when operating the vehicle engine in a fuel cut control mode, repeatedly sensing deceleration of said vehicle and, depending upon a sensed rate of deceleration, implementing one of the following steps:
   (a) when at a first deceleration rate, applying additional engaging pressure to the lockup clutch and at least one shift clutch if it has not yet been applied so as to maintain said vehicle engine in the fuel cut mode while said transmission downshifts; and
   (b) when at a second deceleration rate, lower than the first, canceling any additional pressure applied to said lockup clutch and said shift clutch; and
   at some time during the cycle of repeatedly sensing deceleration and changing clutch pressures as required, causing the vehicle to downshift.

* * * * *